United States Patent [19]

Asthana et al.

[11] Patent Number: 5,590,370
[45] Date of Patent: Dec. 31, 1996

[54] INTELLIGENT MEMORY SYSTEM FOR PROCESSING VARIBABLE LENGTH I/O INSTRUCTIONS

[75] Inventors: Abhaya Asthana; Mark R. Cravatts, both of Berkeley Heights; Paul Krzyzanowski, Fanwood, all of N.J.

[73] Assignee: Lucent Technologies Inc., Murray Hill, N.J.

[21] Appl. No.: 558,208

[22] Filed: Nov. 16, 1995

Related U.S. Application Data

[63] Continuation of Ser. No. 231,528, Apr. 22, 1994, abandoned.

[51] Int. Cl.[6] .................................................. G06F 12/00
[52] U.S. Cl. ..................... 395/800; 375/431; 364/231; 364/244; 364/DIG. 1
[58] Field of Search ................................... 395/800, 842, 395/200.01, 431, 200.1, 828, 833, 311, 405, 438, 442, 476, 497.01, 182.03, 182.05, 700, 650, 375; 365/189.01, 189.04, 220, 230.03, 230.05

[56] References Cited

U.S. PATENT DOCUMENTS

| | | | |
|---|---|---|---|
| 4,604,683 | 8/1986 | Russ et al. | 395/325 |
| 4,731,737 | 3/1988 | Witt et al. | 395/425 |
| 4,881,164 | 11/1989 | Hailpern et al. | 395/200 |
| 4,912,633 | 3/1990 | Schweizer et al. | 395/800 |
| 4,949,245 | 8/1990 | Martin et al. | 395/850 |
| 5,088,023 | 2/1992 | Nakamura et al. | 395/430 |
| 5,134,711 | 5/1988 | Asthana et al. | 395/800 |
| 5,210,860 | 5/1993 | Pfeffer | 395/575 |
| 5,235,685 | 8/1993 | Caldara et al. | 395/308 |
| 5,313,587 | 5/1994 | Patel et al. | 395/275 |

OTHER PUBLICATIONS

A. Asthana, C. Delph, H. V. Jagadish, and P. Krzyzanowski, "Towards a Gigabit IP Router" *Journal of High Speed Networks,* 1 (1992), 281–288, IOS Press.

*Primary Examiner*—Alpesh M. Shah
*Attorney, Agent, or Firm*—Michele L. Conover

[57] ABSTRACT

A memory system contains one or more active storage elements. Each active storage element includes a memory element and a processing element associated with the memory element. The memory element contains microcode for implementing a specific function. A first bus connects the processing element to a host processor. A second bus connects the processing element to a peripheral.

8 Claims, 5 Drawing Sheets

INTELLIGENT MEMORY SYSTEM FOR PROCESSING VARIBABLE LENGTH I/O INSTRUCTIONS

This application is a continuation of application Ser. No. 08/231528, filed on Apr. 22, 1994, now abandoned.

BACKGROUND OF THE INVENTION

The present invention relates to computer systems, and more particularly to memory systems for use in computer systems.

An important use for a computer system is the manipulation of data. This manipulation is sometimes of value in itself, such as organizing a mass of information into tables easily comprehensible by human beings. At other times, the data is manipulated as part of some task that the computer is performing, such as a linear programming optimization process.

The data stored in a computer's memory must be accessed by the computer's control and manipulation circuitry. Conventional memory is composed of multiple locations, each capable of storing information. Each of these locations is much like a post office box. To use the contents of a particular box, you must know its unique identifying number or address. Whenever the computer requires a piece of data, it must know in which location(s) of memory the required data resides. The computer then specifies the address(es) of the appropriate location(s) to the memory, which, in turn, furnishes the computer with the data present in those location(s). Thus, the memory serves as a passive repository of whatever information the computer wishes to place in it.

A computer performs useful tasks by executing programs that are written for it. These programs must have knowledge of the data to be accessed and manipulated as part of the task at hand. Programmers often organize the data into groups called data structures. A programmer typically expends considerable effort keeping track of the actual memory locations involved in each data structure. This book-keeping is not only cumbersome and error-prone, it is terribly inefficient. A simple task, such as a stack access, ideally would take but a single memory access. However, the burden of other operations required to perform the stack access, such as bounds checking and storage management, causes this simple task to require many more accesses to memory.

As illustrated above, the processor-centric designs of existing computer systems are not ideally suited for database and communications applications that by their nature tend to be memory intensive. For example, in communications processing, typically, data from a communication line gets deposited in memory through a system bus with the help of an input/output (I/O) channel processor or direct memory access (DMA) unit. The processing of this data may involve simple, low level operations, such as checksum computation, bit extraction, insertion, header parsing, link list manipulation, table look up, and keyword searches. Generally, no massively processor intensive operations, such as floating point operations, are involved. After the required processing has been completed, the data is placed on an output queue for transmission back to the communication line.

Because these low level operations tend to occur frequently, a great deal of traffic is generated on the system bus resulting in contention on the bus. The processor must continually transmit and receive data from memory so that these necessary low level operations can be performed. In contrast to the over-utilization of the processor, memory tends to be a vastly underutilized resource in computer systems. Conventional memory is not capable of scaling along with the processor and, as a result, the system becomes more congested thereby increasing contention in the system. Large latencies in accessing data from the main memory to the processor cause serious inefficiencies in many computer applications.

SUMMARY OF THE INVENTION

In accordance with the present invention, a multi-port memory system has been realized which is capable of performing low level processing operations. The memory is capable of interacting with a processor via one port and interacting with a peripheral or a communication line via another port, and performing data processing on the data of both ports.

The memory system comprises one or more active storage elements (ASEs). Each ASE contains processing logic that allows it to perform data manipulation operations locally and to communicate over one of at least two ports. The ASEs can be partitioned to support small and large objects of different types, and the ASEs can be grouped to support even larger objects. The processing logic is designed to be capable of performing low level operations such as pointer dereferencing, memory indirection, searching and bounds checking. At least some of the ASEs include at least one backend port which is directly connected to a peripheral, such as a disk or communication line. Data can flow directly into the memory without requiring intervention by the processor. This reduces latency in the system and congestion on the main system bus. The memory system is also scalable both in terms of the overall memory that is available and in terms of the I/O bandwidth that can grow with the size of the ASE array.

By having a memory system which is capable of performing processing operations, much of the low level computation traditionally performed by the host processor can now be off-loaded into the memory system. As a result, memory functionality is increased by devoting more time to manipulating data and performing the more complex and application-specific operations rather than simply moving it. The processor is able to dispatch certain tasks to the memory thereby realizing significant performance gains.

DETAILED DESCRIPTION

The concept of storing data structure elements into memory, manipulating data structure elements within memory, and retrieving data structure elements from memory has been described in U.S. Pat. No. 5,134,711 issued on Jul. 28, 1992 to Abhaya Asthana et al., which is incorporated herein by reference. This disclosure presents an arrangement where a host processor uses an intelligent memory that comprises more than one port (bus interface). The host processor can program the memory to interface with peripherals through a bus that is other than the bus of primary interface between the host and the memory, and direct the memory to process data flowing through that other bus in any prescribed manner.

Although the concept of "data structures" is well known to the computer science artisans, for purposes of this disclosure, it is useful to explicitly state what a "data structure" is. To that end, a paragraph from *The C Programming Language*, by Kernigham et al., Prentice-Hall, 1978, page 119, is quoted below:

A structure is a collection of one or more variables, possibly of different types, grouped together under a single name for convenient handling. (Structures are called "records" in some languages, most notably Pascal.) The traditional example of a structure is the payroll record: an "employee" is described by a set of attributes such as name, address, social security number, salary, etc. Some of these in turn could be structures: a name has several components, as does an address and even salary.

Structures help to organize complicated data, particularly in large programs, because in many situations they permit a group of related variables to be treated as a unit instead of as separate entities.

Figure 1:
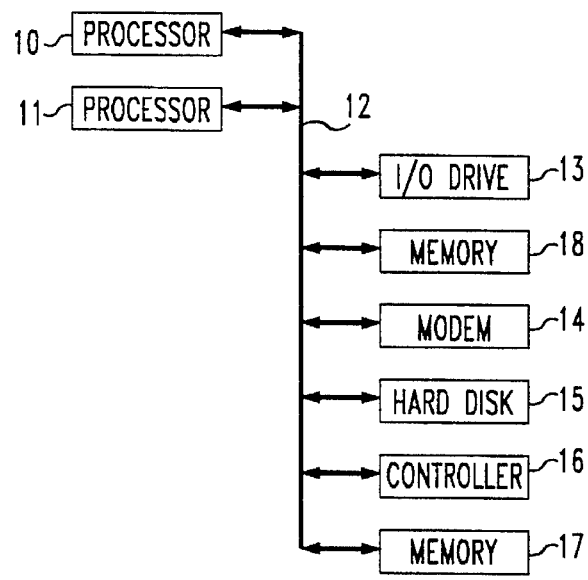
FIG. 1 depicts a prior art arrangement that includes two processors and peripheral equipment including a memory.

FIG. 1 presents a generalized schematic diagram of a prior art multiprocessor arrangement. It includes processors 10 and 11, a common bus 12 to which processors 10 and 11 are connected, and peripheral devices 13–18. Devices 17 and 18 are memories. In operation, the processors contend for bus 12, and the processor that is successful is given access to any one of the devices connected to the bus. Such an arrangement clearly results in bus 12 being a potential bottleneck in the communication process between the processors and the devices. To alleviate the problem, some designers include a cache memory with each processor. This approach helps to reduce bus contention, but it does not solve the basic communication problem between the processor and the memory. Memory accesses still take the form of elementary fetches and stores.

Figure 2:
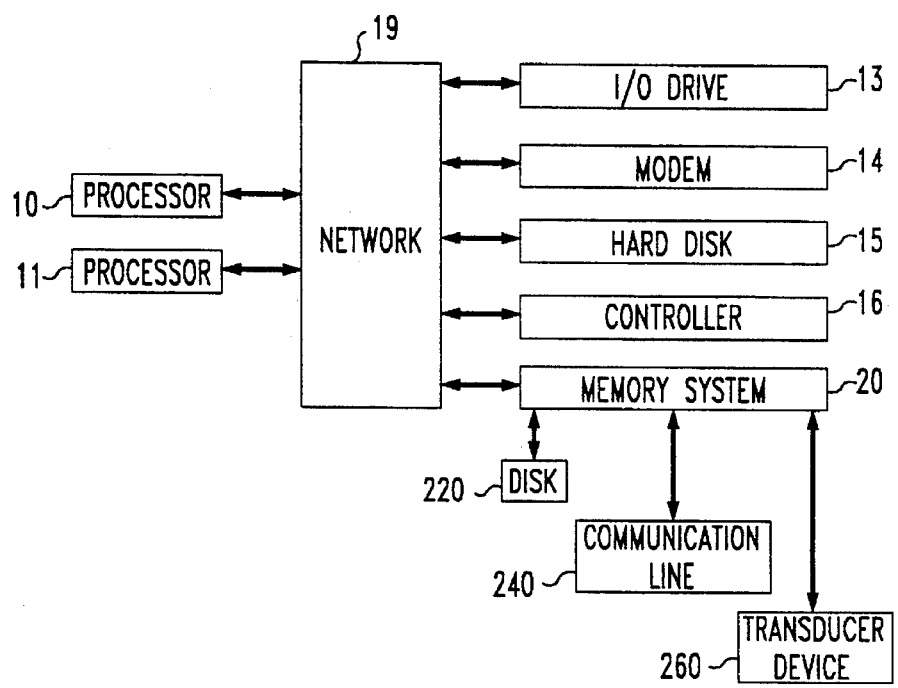
FIG. 2 presents a generalized block diagram of a computer system in accordance with the principles of our invention.

FIG. 2 presents a block diagram of a computer system in accordance with the principles of our invention. For purposes of example, it includes processors 10 and 11, and peripheral devices 13, 14, 15, and 16. In FIG. 2, the processors are connected to a switching network 19. Also, in accordance with the principles of our invention, the FIG. 2 computer system includes a memory system 20 connected to network 19. Memory 20 unlike the memories in FIG. 1 is composed of memory modules that include controlled processing and communication capabilities. More specifically, the memory module includes backend ports (see also FIG. 4) which can be interfaced to a variety of peripherals. In FIG. 2, for illustrative purposes, a small computer system interface (SCSI) disk controller 220, a communication line 240, and a transducer device 260 are shown.

Network 19 permits one processor to communicate with memory system 20 while another processor is communicating with some other peripheral device. Network 19 addresses the contention problem but not the low level of communication to and from the memory. The latter is addressed by the intelligence within memory system 20. It should be realized, of course, that users who do not have a contention problem (e.g., in applications where conflict is not likely to occur), network 19 can be eliminated. In accordance with the present invention communication between the memory system and some peripheral devices may often occur without the involvement of any processor.

Figure 3:
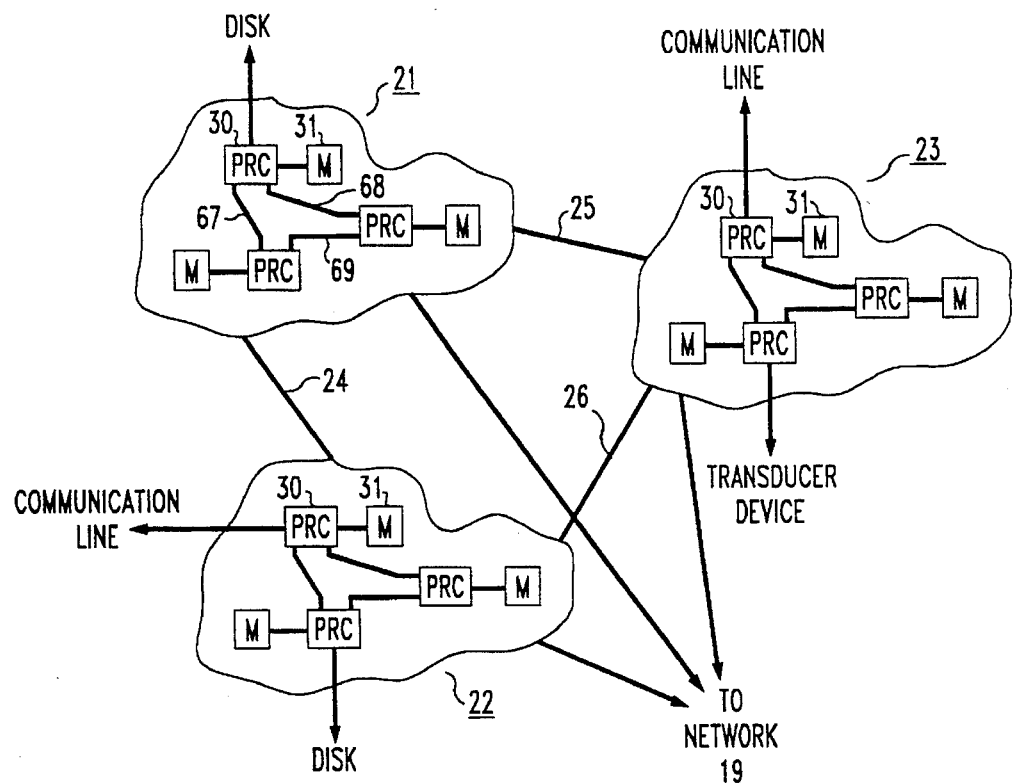
FIG. 3 presents a more detailed diagram of the memory system in FIG. 2.

FIG. 3 depicts memory 20 in somewhat greater detail. It contains memory modules 21, 22, and 23 that are interconnected with a network, such as with the network comprising communication lines 24, 25, and 26. Modules 21–23 are also connected to network 19. Each memory module contains a plurality of ASEs with each ASE containing a processor element 30 and a memory element 31. Processor element 30 and associated memory element 31 are an example of an ASE. Each processing element 30 may further include a port 47 which is connected to peripherals. The ASEs are also interconnected in a network, such as the network comprising lines 67, 68, and 69, that makes up the memory module.

Figure 4:
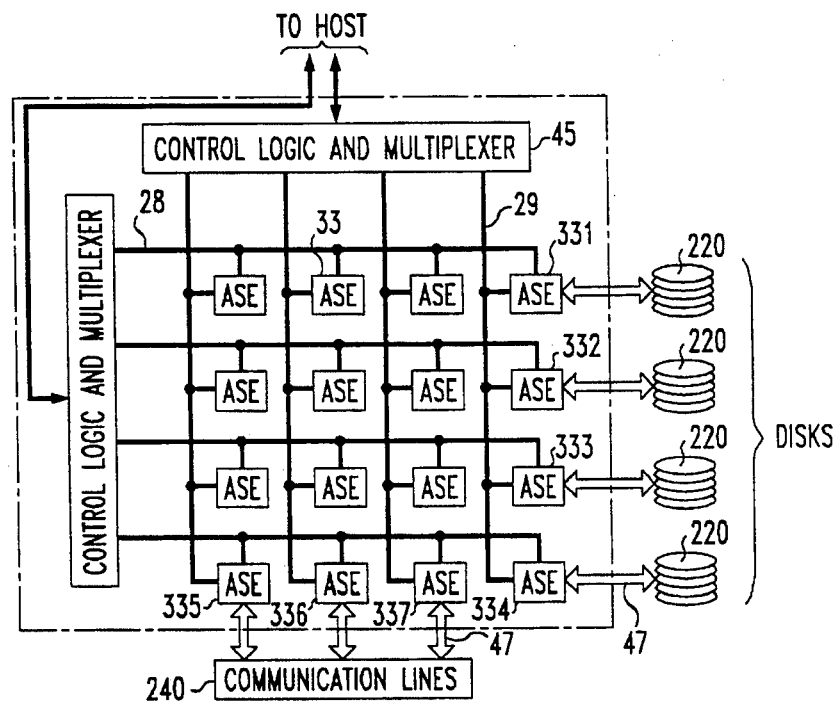
FIG. 4 describes one implementation for the network that interconnects the ASE units of memory system 20 in a memory module.

FIG. 4 presents another embodiment for the memory module. It contains a switching fabric of bidirectional communication lines arranged, diagrammatically, in rows and columns, such as lines 28 and 29. Each ASE module such as 33, forms a "cross-point" between each row line and column line. Any of the row or column lines can be designated for communication with other ASEs, and, likewise, any row and column line can be designated for communication with network 19. Communication can occur between ASEs in a given memory module via the row and column lines in combination with passing through other ASEs in any one of a number of known ways. In addition, memory modules can be added to the array by extending any of the rows or columns (or both) contained in the existing array, thereby expanding the overall capacity. Communication can be effected through packets, with each packet having a destination address that, in accordance with a prescribed procedure, permits each ASE that encounters the packet to know whether it should transfer that packet from the row to the column, or vise versa. In that capacity the ASE serves merely as a cross-over switch. Control logic (CLAM) 45 connects the ASEs to the network 19 or a system bus. Connected to the system bus is a host processor (not shown).

In the arrangement illustrated in FIG. 4, ASEs 331, 332, 333, and 334 include a backend port and those backend ports are each connected to a disk storage device. ASEs 335, 336, 337 also include a backend port, and those backend ports are each connected to a communications line. All other ASEs don't utilize their backend ports. Of course, other arrangements can easily be implemented. The ASEs that connect to a peripheral (e.g., to disk 220 or communication line 240) perform low level operations on the data without intervention by the host processor. The host processor thus treats the memory module as its own intelligent memory that interfaces with peripherals on behalf of the host processor, with minimal direction from it.

Figure 5:
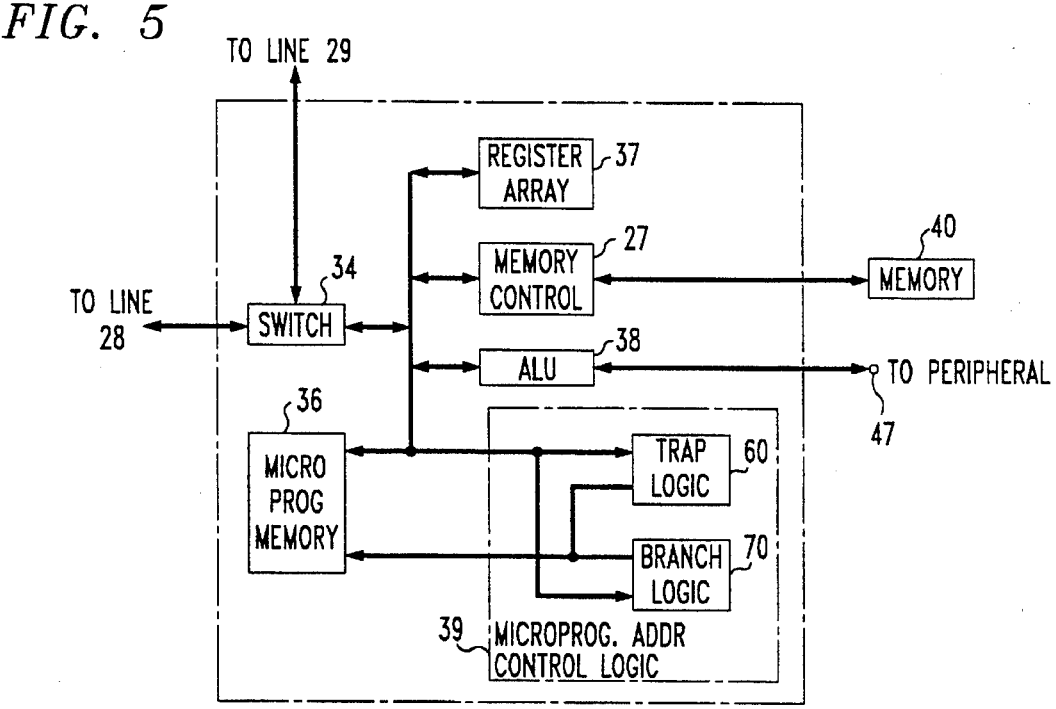
FIG. 5 presents a block diagram of an ASE unit.

FIG. 5 depicts the block diagram of one embodiment for the processing element in an ASE adapted for operating in the switching environment of FIG. 4. It contains a switch 34 connected to two ports of the processing element, which serves as the cross-over switch discussed above, and a common bus 35 to which a number of blocks are connected. Specifically, bus 35 interfaces with a microprogram memory 36, with register array 37, with arithmetic logic unit (ALU) 38, with microprogram address control logic 39, with memory control logic 27. A backend port 47 interfaces with the ALU 38 via a second bus. The backend port 47 may be adapted, for example, to operate in accordance with the small computer system interface (SCSI) protocol, or other suitable communication protocol.

In operation, memory system 20 is subject to two types of access. One is to program the memory system in general, and each of the needed ASEs in particular. The programming specifies the data structures that the memory system will be required to handle and the manner of performing the required operations on these data structures. For example, one program module would define the data manipulation processing that shall be expected of the ASEs vis-a-vis data on the backend port, another program would define the data manipulation vis-a-vis one primary interface (to the host), still another program module would define the interaction between the different ASEs when more memory or data manipulation is needed for a particular task than is available to a particular processor module, etc. The second type of access is to instruct the memory system to actually perform the desired task. This can be, for example, to store a word of data in a LIFO stack, to access a "parent" of the last-accessed "child", etc. Stated in other words, the host processor can direct interactions with memory 40 in FIG. 5, or memory 36 in FIG. 5.

The intelligence that permits ASEs to perform the type of tasks mentioned above resides in microprogram memory 36. This memory is accessed under control of microprogram control logic 39, and it provides the necessary control signals for effecting the necessary actions at ALU 38, register array 37, and memory 40. Memory 36 can be a conventional memory but in our preferred embodiment, microprogram memory 36 comprises four 32-bit memory modules of 256 words each. The reason for this design lies in our desire to permit variable length instructions to be stored efficiently, and at the same time, to permit parallel access to the stored variable length instruction. Microprogram address control logic 39 comprises a trap logic block 60, and a branch logic block 70.

Register array 37 includes a collection of registers that are used to store various transitory values of the ALU and the memory. For example, registers 37 may be involved in circuitry that performs pattern matching by keeping a match pattern in the registers, and comparing the stored values to data obtained from memory 40 in ALU 38. The Arithmetic Logic Unit of the processor can be of any conventional design and, therefore, it is not in detail herein.

The following briefly details embodiments incorporating the above-described structure in the context of our invention.

One of the applications in which the present invention can be incorporated is that of an internet protocol (IP) router. An IP router routes a plurality of packets through a network from a source to a destination. Each packet includes an IP header which contains information about the source and destination of the particular packet as well as other information, such as the size of the packet. As a packet travels from the source to the destination, the packet may travel through several intermediate links referred to as "hops". When a packet reaches a hop, it must be routed to the next hop. A router receives packets from one or more incoming links and sends the packet out along any one of a plurality of outgoing links based on the destination of the particular packet. The router must be able to keep up with the traffic on the incoming links in order to avoid a bottleneck situation. The details of an IP router are described in A. Asthana et al., "Toward a Gigabit IP Router," *Journal of High Speed Networks* 1, IOS Press, 1992, pp. 281–288 which is incorporated herein by reference.

Figure 6:
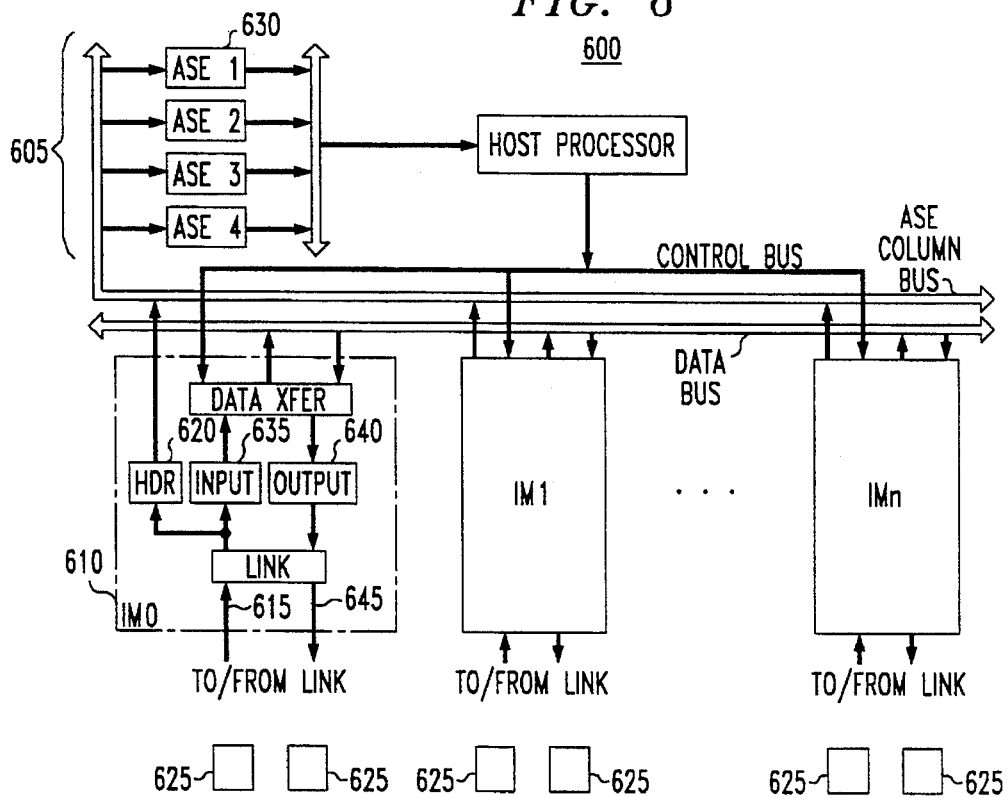
FIG. 6 depicts an internet protocol router incorporating a memory system in accordance with the present invention.

In processing the IP header, the router of FIG. 6 must perform many data-intensive operations including error checks, concomitant recomputation of check sums and determination of the next hop. Three primary functions are performed by the router: reception and transmission of a packet from and to the link, deciding the outgoing link on which the incoming packet should be transmitted, and, switching the packet from the input link to the output link. In the arrangement of FIG. 6, the processing tasks are divided into the set of low level operations that are assigned to the ASEs, and the complex and computation-intensive operations that are kept by the host processor. The specific division of labor is, of course, up to the designer, striking a balance between the kind of operations that are basically "standard" object manipulation processes ("standard" for the application at hand) and the more application-specific operations.

FIG. 6 illustrates a block diagram of a router 600 which includes a memory system 605 consistent with the present invention. Data packets 625 are received by control circuitry 610 via an incoming link 615 which strips the IP header 620 from the packet 625. The control circuitry 610 sends the header 620 to an ASE 630 for validating and routing. The remainder of the packet 625 is placed in a buffer 635 located in a source interface module.

The ASEs 630 are arranged in parallel and each ASE 630 is capable of processing a different header 620. The ASE 630 determines from the header 620 the destination of the packet 625 and based on that information on which outgoing link 645 the packet should be transmitted. The processing of the header includes the creation of a new header containing the destination and other routing information and error checking to make sure the information is correct. The ASE 630 then updates the fields of the header 620 to the appropriate destination interface information. The remainder of the packet is then transmitted from the buffer 635 in the source interface module to a buffer 640 in the destination interface module. The processed packet is then routed to the host processor which performs the actual movement of the data to the next hop.

The ASEs may also perform order-maintenance so that packets are sent out in the same order in which they are received. The router functions are entirely performed by the ASEs without intervention by the processor thereby increasing the overall throughput of the system. In addition, the processing of the headers by the ASEs increases the processing speed so that one gigabit per second packet rates could be accommodated.

Figure 7:
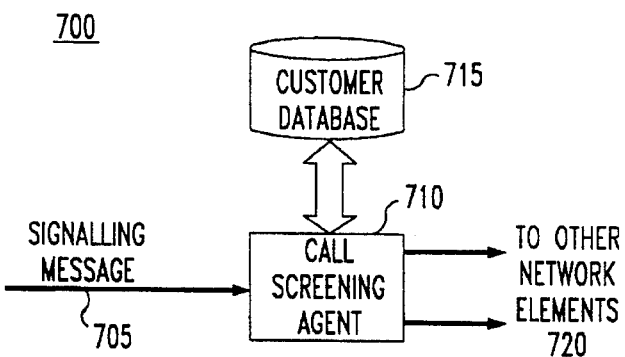
FIG. 7 illustrates a block diagram of a call screening and detection system incorporating memory system of the present invention.

Another application which incorporates the memory system of the present invention is a call screening and detection system 700 which diverts telephone calls from a standard switching service to one of several service processors as illustrated in FIG. 7. The service processors provide special services and call monitoring services without further burdening the switching service. A call screening agent 710 receives the signaling messages on line 705 from an incoming telephone call and determines whether it should be processed by a service processor or simply be routed through the network.

The call screening agent 710 makes this determination by performing a database lookup of either the calling number of the party placing the telephone call or the called number of the party to which the call is to be received in real-time to determine if the call is subject to a special service. If the call is subject to a special service, the call screening agent identifies the particular service processor which will enable the particular service.

Figure 8:
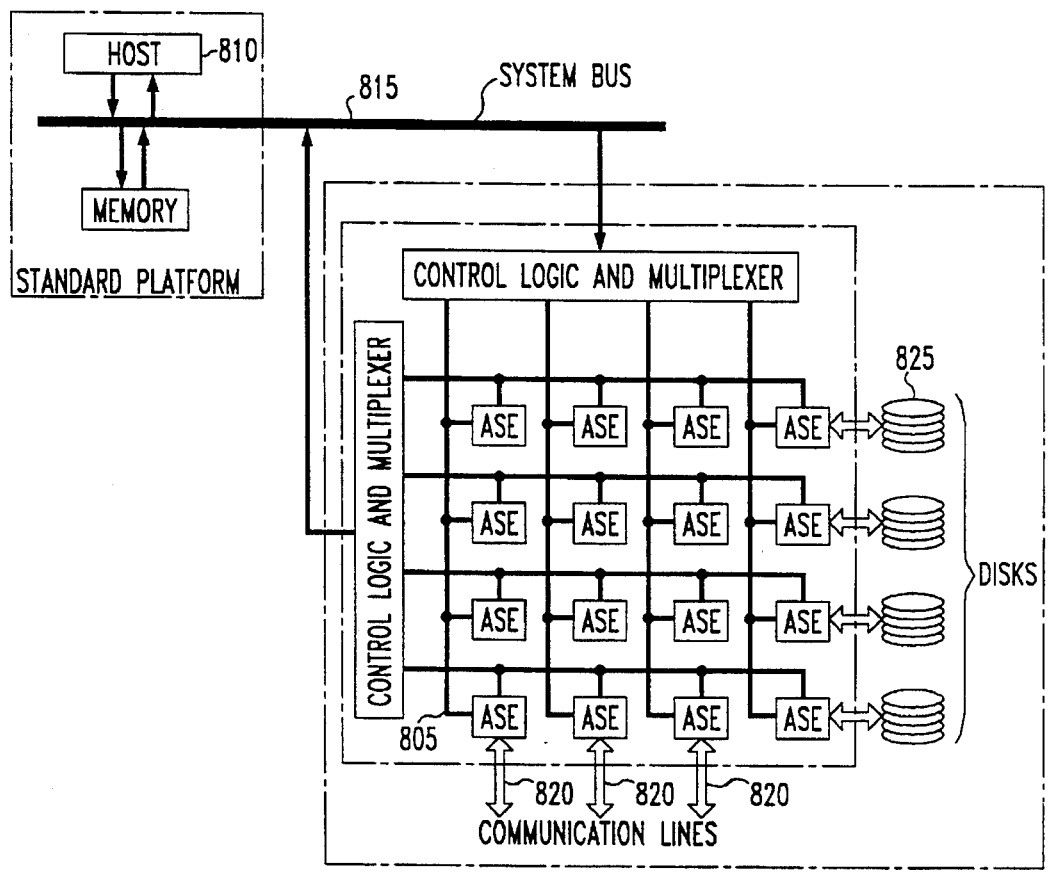
FIG. 8 depicts an architecture of the call screening agent of FIG. 7.

The architecture of the call screen agent 710 is illustrated in FIG. 8. In accordance with the present invention, the maintenance, configuration and administration functions are performed by a host processor 810 and basic communication and query processing operations are performed by an array of ASEs 805. The array of ASEs 805 are plugged into host processor 810 via a system bus 815. Messages from communication lines are received and processed by the ASEs 805. The communication processing involves the reception and transmission of message signaling packets from and to the communication lines 820. The query processing involves the interfacing of the ASEs 805 to a plurality of random access memory (RAM) disks 825 which contain customer databases which indicate if special services are applicable. The microcode for performing the communications processing and query processing is functionally partitioned and reside on separate ASEs.

The ASEs 805 receive signaling messages directly from communication lines 820 and performs the necessary low level processing of the messages. Among the processes performed by the ASEs 805 is the lookup of data corresponding to either the calling party or the called party in disks 825 which contain customer databases.

The database is accessed by an ASE which performs query processing through a hashed look-up. The memory element of the query processing ASE contains indices of disk blocks. A calling party's telephone number on the called party's telephone number is hashed yielding a pointer to an index. The index contains a starting point from which the desired record is searched. From the information retrieved from the database, the ASE determines whether the call should be directed to a special service processor. If not the call is rerouted to the network. The ASEs are programmable thereby allowing for changes in the configuration of the ASEs to update services and to add new services. All of this processing can occur with virtually no involvement by the host processor 810.

Figure 9:
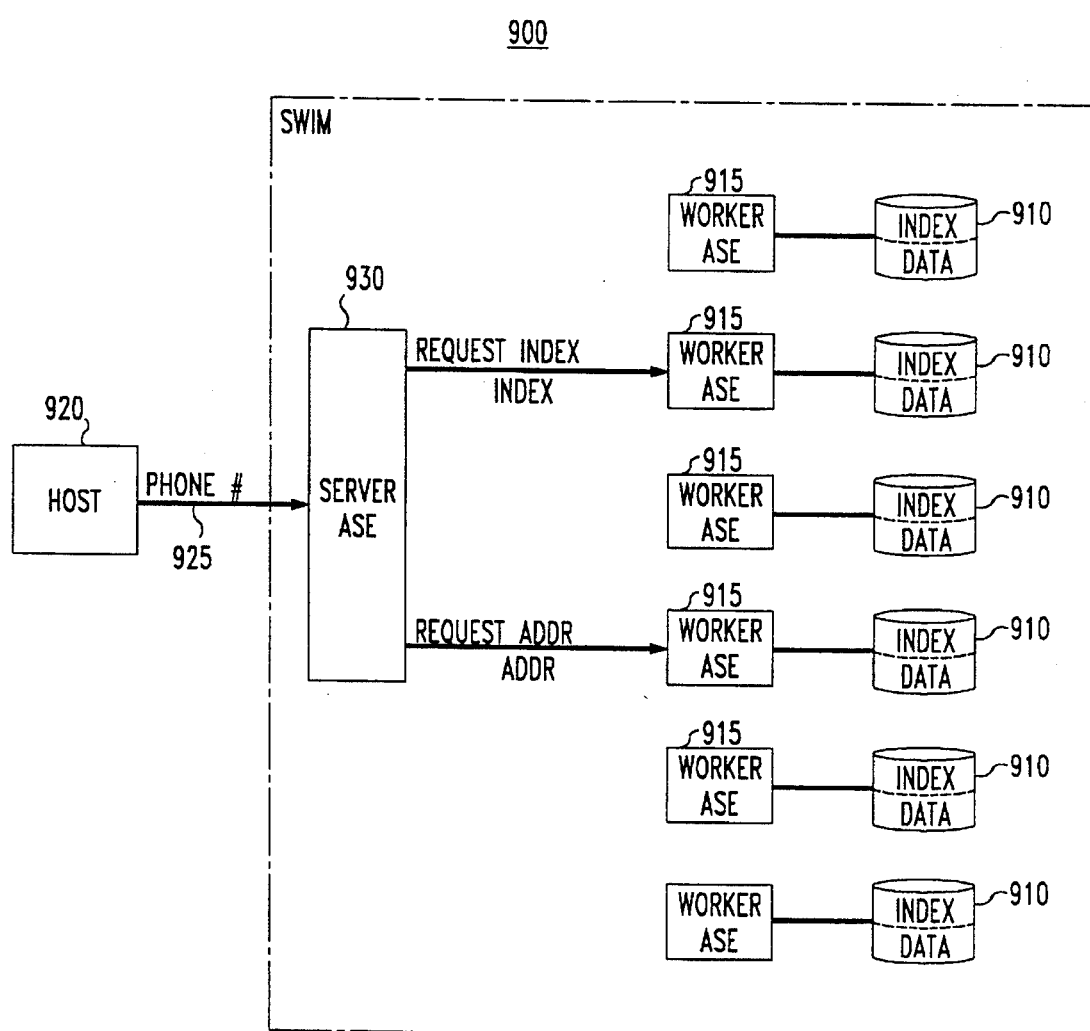
FIG. 9 depicts an inverse query telephone server incorporating the memory system of the present invention.

Another application which can be implemented using the memory system of the present invention is a system which is capable of inverse querying a telephone database. Such querying capabilities are used in services such as caller identification and other intelligent telephone services. FIG. 9 illustrates an architecture for a telephone number server 900 which is capable of providing such telephone number information in addition to all other tasks that are performed by the host processor (server). The server views the directory information in terms of objects and interacts with the ASEs by dealing with objects. It can supply a new object to the ASEs, or ask for retrieval of a stored object from the ASEs, etc. The ASEs, in turn, maintain the objects, those being directory records containing customer name, street address, city, state, zip code and telephone number.

Internally within the intelligent memory, an ASE 915 is associated with each disk 910 and is responsible for indexing the data contained in that disk. The index processing involves receiving the telephone number from host processor 920, routing the number to the right ASE, selecting the right memory page and performing a memory index lookup and desk block search. Host processor 920 transmits data corresponding to the telephone number of a calling party to the server 900 over line 925 to an ASE 930 which acts as the main server. The server ASE 930 directs the telephone number data to a worker ASE 915 which is associated with a disk 910 which contains the telephone number data and corresponding customer information. The disk 910 identifies the telephone number data via a look up table and retrieves the corresponding customer information. The retrieved customer information is then transmitted back to the host processor 920 via the server ASE 930 and worker ASE 915 which transmits the information over the network (not shown) to the called party.

It will be appreciated that those skilled in the art will be able to devise numerous and various alternative arrangements which, although not explicitly shown or described herein, embody the principles of the invention and are within its scope and spirit.

We claim:

1. A memory system comprising two or more active storage elements, said two or more active storage elements arranged in an array, at least one of said active storage elements comprising:

a memory element;

a processing element associated with said memory element, said memory element being capable of receiving and storing variable length instructions which are used to implement a specific function;

means for compiling and downloading said variable length instructions to said memory element at run time, first bus for connecting said processing element to a host processor;

second bus for connecting said processing element to a peripheral; and means for connecting said at least one active storage element to at least one other active storage element.

2. The memory system according to claim 1 wherein a small computer system interface (SCSI) protocol is implemented over said second bus.

3. The system according to claim 1, wherein said at least one active storage element further comprises means for communicating with processing elements of other active storage elements contained in the array to enlist those other active storage elements in the performance of specified manipulations on data stored in the memory elements of those other active storage elements.

4. The system according to claim 3, further comprising means for transmitting a packet to said processing element of an active storage element for invoking said variable length instructions.

5. The memory system according to claim 4 further comprising means for transporting a packet received by a first active storage element to a second active storage element for invoking variable length instructions contained in said second active storage element.

6. The memory system according to claim 4 wherein said means for transmitting a packet is the host processor.

7. A computer system comprising:

a host processor;

memory comprised of two or more active storage elements which are arranged in an array, each active storage element comprising a memory element and a processing element associated with the memory element, said memory element being capable of receiving and storing variable length instructions which are used to implement one or more functions, said host processor compiling and downloading said variable length instructions to said memory at run time;

at least one peripheral;

a first port for connecting said processing element to said host processor;

a second port for connecting said processing element to at least one of the peripherals, said processing element receiving data from said peripheral via a bus that is independent of the connection of the host processor to the first port; and means for transmitting a packet to said processing element for invoking said variable length instructions, said invoked variable length instructions being capable of performing low level operations.

8. In a memory module comprised of one or more intelligent memory modules interconnected to form a memory array and further connected to a bus interface, each memory module comprising:

switching means for designating communication between one or more intelligent memory modules;

means for storing data, said storing means being capable of transmitting and receiving data over the bus interface;

program memory being capable of receiving and storing variable length instructions which are used to implement one or more functions; means for compiling and downloading said variable length instructions to said program memory at run time;

processing means associated with said program memory for executing said variable length instructions in response to receipt of a message; and interface means other than said bus interface for connecting a peripheral directly to said processing means.

* * * * *